(12) United States Patent
Lam

(10) Patent No.: US 11,449,100 B2
(45) Date of Patent: Sep. 20, 2022

(54) DOCKING STATIONS INCLUDING CRADLES

(71) Applicant: HEWLETT-PACKARD DEVELOPMENT COMPANY, L.P., Spring, TX (US)

(72) Inventor: Chern-Shi Lam, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 237 days.

(21) Appl. No.: 16/634,263

(22) PCT Filed: Jul. 31, 2018

(86) PCT No.: PCT/US2018/044573
§ 371 (c)(1),
(2) Date: Jan. 27, 2020

(87) PCT Pub. No.: WO2019/028003
PCT Pub. Date: Feb. 7, 2019

(65) Prior Publication Data
US 2020/0379514 A1    Dec. 3, 2020

Related U.S. Application Data

(60) Provisional application No. 62/539,520, filed on Jul. 31, 2017.

(51) Int. Cl.
*G06F 1/16* (2006.01)
*G06F 13/40* (2006.01)

(52) U.S. Cl.
CPC ............ *G06F 1/1632* (2013.01); *G06F 1/163* (2013.01); *G06F 13/4068* (2013.01)

(58) Field of Classification Search
CPC .... G06F 1/1632; G06F 1/163; G06F 13/4068; E05B 73/0082; G11B 33/12
(Continued)

(56) References Cited

U.S. PATENT DOCUMENTS 6,093,039 A * 7/2000 Lord ..................... G06F 1/1632
                                                               361/679.41
6,744,627 B2   6/2004 Won et al.
(Continued)

FOREIGN PATENT DOCUMENTS

CN    206182611 U       5/2017
JP    2000089850 A  *   3/2000

OTHER PUBLICATIONS

MSI, VR One 6rd-007US Mini PC, < https://www.amazon.com/MSI-VRONE-6RD-007USMini/dp/B01M31Z50E >.

*Primary Examiner* — Adrian S Wilson
*Assistant Examiner* — Gage Crum
(74) *Attorney, Agent, or Firm* — Brooks Cameron & Huebsch PLLC

(57) ABSTRACT

Example implementations relate to docking stations including cradles. In some examples, a docking station can include a housing including a cradle defining a cavity, the cavity having a width and a depth sufficient to prevent an electronic device coupled to the docking station from decoupling from the docking station responsive to a torque applied on the electronic device, an engagement member to couple to the electronic device when received in the cradle, and a docking connector to transfer data between the docking station and the electronic device when the electronic device is coupled to the docking station.

18 Claims, 7 Drawing Sheets

(58) Field of Classification Search
USPC .................................................. 361/679.03
See application file for complete search history.

(56) References Cited

U.S. PATENT DOCUMENTS

| | | | |
|---|---|---|---|
| 7,054,154 B2 | 5/2006 | Mullen et al. | |
| 2004/0120112 A1* | 6/2004 | Mullen | G06F 1/1632 361/679.41 |
| 2004/0224638 A1* | 11/2004 | Fadell | G06F 17/00 455/66.1 |
| 2006/0250764 A1* | 11/2006 | Howarth | G06F 1/1632 361/679.56 |
| 2007/0014080 A1* | 1/2007 | McCormack | G06F 1/1632 361/679.41 |
| 2008/0239658 A1* | 10/2008 | Chou | H01R 13/633 361/679.42 |
| 2009/0168312 A1* | 7/2009 | Motoe | G06F 1/1632 361/679.01 |
| 2009/0174998 A1 | 7/2009 | Struthers | |
| 2010/0188808 A1* | 7/2010 | Howarth | G06F 1/1632 361/679.41 |
| 2011/0286622 A1* | 11/2011 | Conrad | H04R 5/02 381/386 |
| 2012/0025051 A1* | 2/2012 | Nishiyama | G06F 1/1632 248/346.03 |
| 2012/0212910 A1* | 8/2012 | Katsuta | G06F 1/1616 361/747 |
| 2012/0293924 A1 | 11/2012 | Dolci | |
| 2016/0227509 A1 | 8/2016 | Krenz | |
| 2017/0108892 A1 | 4/2017 | Lenzi | |

\* cited by examiner

DOCKING STATIONS INCLUDING CRADLES

BACKGROUND

Headsets may be used in virtual reality (VR) and/or augmented reality (AR) systems. VR and/or AR headsets may be worn by a user and may include displays to provide a "virtual" and/or "augmented" reality to the user by providing images, screens, and/or other visual stimuli to the user via the displays. For instance, VR/AR systems may include a computing device coupled to a display to provide a "virtual" and/or "augmented" reality to the user by providing images, screens, and/or other visual stimuli to a user of the computing device via the displays.

DETAILED DESCRIPTION

Figure 1:
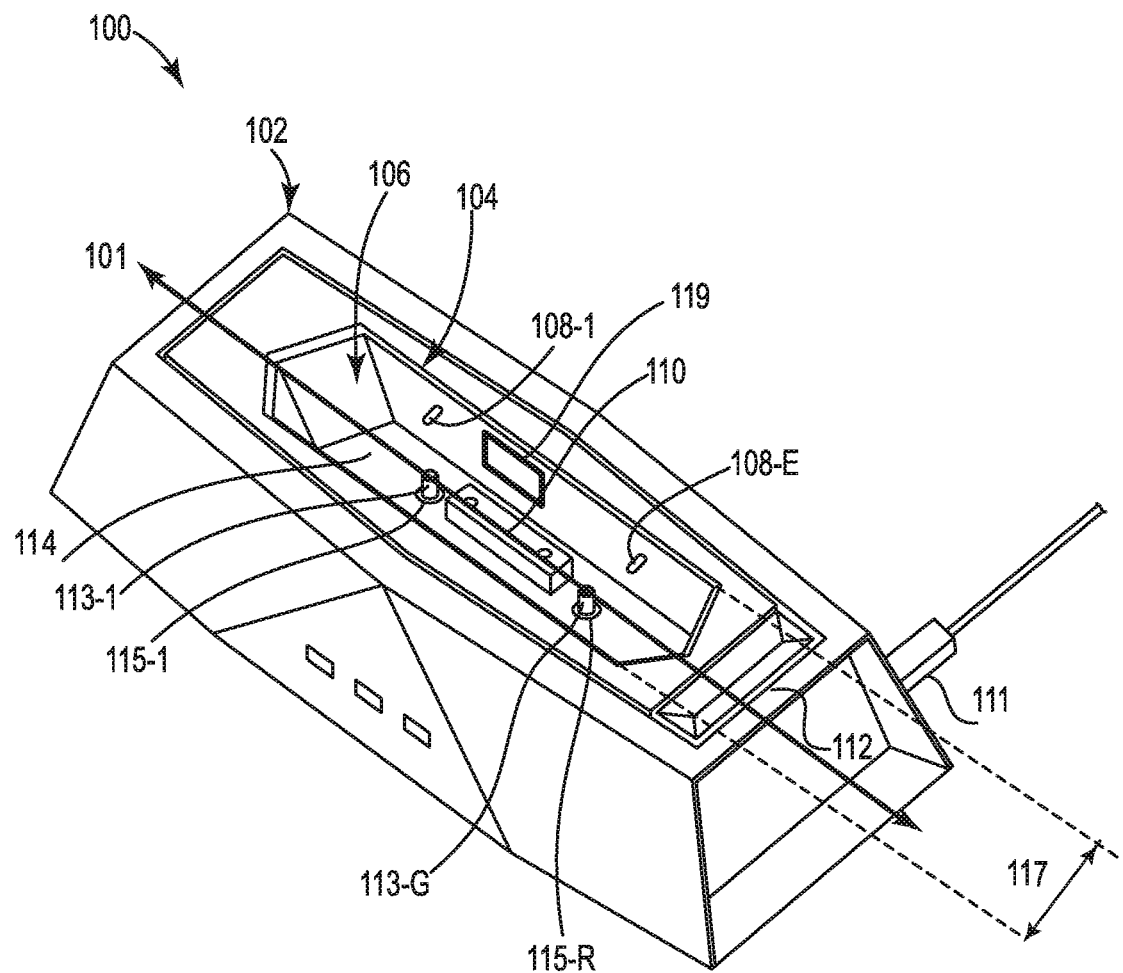
FIG. 1 illustrates an example of a docking station including a cradle consistent with the disclosure.

A VR/AR system may include a computing device. The computing device may be worn by a user, for instance, in a backpack worn by a user of the computing device. The computing device may be coupled to a VR/AR headset that covers a user's eyes and provides visual stimuli to the user via a display, thereby substituting a "virtual" reality for actual reality. The VR system may allow the user to interact with the "virtual" reality world through games, educational activities, group activities, and the like.

An AR system may provide an overlay transparent or semi-transparent screen in front of a user's eyes such that reality is "augmented" with additional information such as graphical representations and/or supplemental data. For example, an AR system may overlay transparent or semi-transparent weather information, directions, and/or other information on an AR display for a user to examine.

VR/AR systems may be used in many different fields and/or for many different applications. For example, VR/AR systems may be used in gaming, aviation, engineering, medicine, geopositioning, training, military, government (e.g., fire, police, etc.), and sports, among other fields.

To allow a user to access other computer components and/or to connect to a network, and/or to provide various capabilities such as those associated with a desktop computer/laptop computer, a computing device of a VR/AR system may be coupled to a docking station. For instance, the computing device may couple to the docking station to interconnect with other computer components coupled to the docking station. For example, a docking station may provide interconnections with standard sized computer components such as a monitor or full-sized keyboard, or allow for an additional media device, such as a hard disk drive or digital video disk ("DVD" drive, to be used with the computing device). Some docking stations may provide auxiliary ports for placing expansion cards that can be accessed by the computing device.

However, a computing device may be subjected to undesirable mechanical forces when attempting to couple to a docking station (i.e., while docking), while coupled to a docking station (i.e., when docked), and/or while decoupling from the docking station (i.e., while undocking). As a result of being subject to the undesirable forces the computing device may be damaged. Moreover, in some approaches, docking stations may maintain a docked device primarily in a horizontal orientation, for instance, to facilitate use of components such as a keyboard included in the computing device.

Accordingly, the disclosure is directed to docking stations including cradles. For instance, in some examples, a docking station can include a housing including a cradle defining a cavity, the cavity having a width and a depth sufficient to prevent an electronic device coupled to the docking station from decoupling from the docking station responsive to a torque applied on the electronic device, an engagement member to couple to the electronic device when received in the cradle, and a docking connector to transfer data between the docking station and the electronic device when the electronic device is coupled to the docking station. Desirably, docking stations including cradles can be shaped and/or sized to maintain an electronic device (e.g., a computing device of a VR/AR system) in a stable manner with less 'wobble', as described herein, and in a thermally efficient vertical orientation, in contrast to other approaches which may lack a cradle and/or maintain an electronic device primarily in a horizontal orientation.

FIG. 1 illustrates an example of a docking station 100 including a cradle 104 consistent with the disclosure. As illustrated in FIG. 1, the docking station 100 can include a housing 102, the cradle 104 defining a cavity 106, an engagement member such as a first engagement member 108-1 and/or a second engagement member 108-E which are referred to herein as engagement member 108, a docking connector 110, a locking mechanism 111, a release 112, a guide pin such as a first guide pin 113-1 and/or a second guide pin 113-G which are referred to herein as guide pin 113, a trigger such as a first trigger 115-1 and/or a second trigger 115-R which are referred to herein as trigger 115, among other possible components including those described herein.

Input/output ports among other electronic circuitry or other components such as a link bar can be disposed within a volume of the housing 102. As used herein, "disposed" means a location at which something is physically positioned. The housing 102 can be formed of fabric, metal, and/or plastic, among other suitable materials to promote various aspects of docking stations including cradles, as described herein.

The cradle 104 can define a cavity 106 to receive a portion of an electronic device. As used herein, a cradle refers to a depression in a material such as a material of the housing 102. The cradle 104 is sized and/or shaped to define the cavity 106 to receive at least a portion of an electronic device within a volume (as defined by the cradle 104) of the cavity 106. In some examples, the cavity can have a width 117 and a depth, as described herein, sufficient to prevent disengagement of the electronic device responsive a torque applied on the electronic device.

For instance, the cradle 104 can have a depth less than a height of an electronic device (not illustrated in FIG. 1). Similarly, in some examples, the cradle 104 and therefore the cavity 106 can have a width 117 extending from any portion of an exterior surface of the housing 102 surrounding the cavity to another portion of the exterior surface on an opposite side of the cavity 106 less than a height of the electronic device, as described herein. The width 117 can be less than, equal to, or greater than a depth of the cavity. The width 117 and/or the depth can be predetermined depending upon an intended make, model, and/or type of electronic device to be coupled to the docking station. The width 117 can be from 1 millimeter to 200 millimeters, among other possibilities. All individual values and subranges from 1 millimeter to 200 millimeters are included. For instance, in some examples, the width 117 can be from 4 millimeters to 25 millimeters.

In some example, the cavity can have a volume (as defined by the cradle 104) to receive at least 3 percent of an electronic device (e.g., to receive at least 3 percent of a total surface area of a housing of an electronic device such as a VR computing device, as describe herein. As used herein, a total surface area of a housing of an electronic device this disposed in a cavity refers to a portion of a surface area of an electronic device this is within a volume of a cavity (e.g., a portion of the surface area that is 'below' a plane that is coplanar with an exterior surface such as exterior surface 216 illustrated in FIG. 2 of a housing). As illustrated in FIG. 1, the cradle 104 can be formed of a continuous material that surrounds a circumference of the housing of the electronic device. The cradle 104 can be formed of a fabric, metal, and/or plastic, among other suitable materials. The cradle can be formed of the same material as the housing 102 or can be formed of a different material than the housing 102.

In some examples, the cradle 104 can include an elastomeric component 119 in a surface of the cradle 104. Examples of suitable elastomeric materials include natural and synthetic rubbers, among other types of elastomeric materials. The elastomeric material can promote a friction fit between a surface of the cradle 104 and an electronic device disposed in the cradle 104 and coupled to the docking station 100. While illustrated at an individual elastomeric component 119 it is understood that any number of elastomeric components can be included in the docking station 100. For example, the docking station can include two elastomeric components positioned at respective distal ends of the cavity to cushion and promote a friction fit between an electronic device disposed in the cavity 106 between the two elastomeric components.

The engagement member 108 refers to a mechanical member to lock or otherwise couple an electric device to the docking station 100. Examples of suitable engagement members include protrusions such as a pin, a hooked engagement member, and/or a clamp among other suitable engagement members. For instance, in some examples the engagement member can include a hooked engagement member to couple to a corresponding recess (sized and/or shaped to receive at least a portion of the hooked engagement member) in a housing of an electronic device. While FIG. 1 illustrates a total of two engagement members (the first engagement member 108-1 and the second engagement member 108-E) a total number of engagement members can be increased or decreased. For instance, in some examples, a docking station may include a total of one engagement member, among other possibilities.

The engagement member 108 alone, or in some examples, in conjunction with a spring force exerted via a link bar, may disposition an electronic device against the cradle 104, the engagement member 108, and/or other component of the docking station 100. For example, the engagement member 108 can disposition an electronic device against the cradle 104, the guide pin 113, and/or the docking connector 110. In this manner, the engagement member 108 can promote orientation of an electronic device primarily in a vertical orientation (as illustrated and described in greater detail with respect to FIG. 3 and FIG. 4) when coupled to the docking station 100. Additionally, the engagement member 108 can secure an electronic device to the docking station 100 to prevent the electronic device from accidental and/or unauthorized decoupling from the docking station 100, as described herein. For instance, in some example, an engagement member can be formed from an elongated hook which may extend and attach or otherwise couple to a housing (e.g., a bottom portion that is to be disposed in a cavity of the cradle) of an electronic device.

The docking connector 110 refers to an electromechanical connector to permit data and/or power communication between the docking station 100 and an electronic device. Examples of docking connectors include various buses such as a PCI bus and/or a universal serial bus, among other types of docking connectors. As illustrated in FIG. 1, the docking connector 110 can be disposed on an innermost surface 114 of the cradle 104. In this manner, the docking connector can be recessed a distance within a volume of the cavity 106 to protect the docking connector from various forces that may directly contact the housing 102 but not directly contact the docking connector 110 recessed in the cavity.

Figure 4:
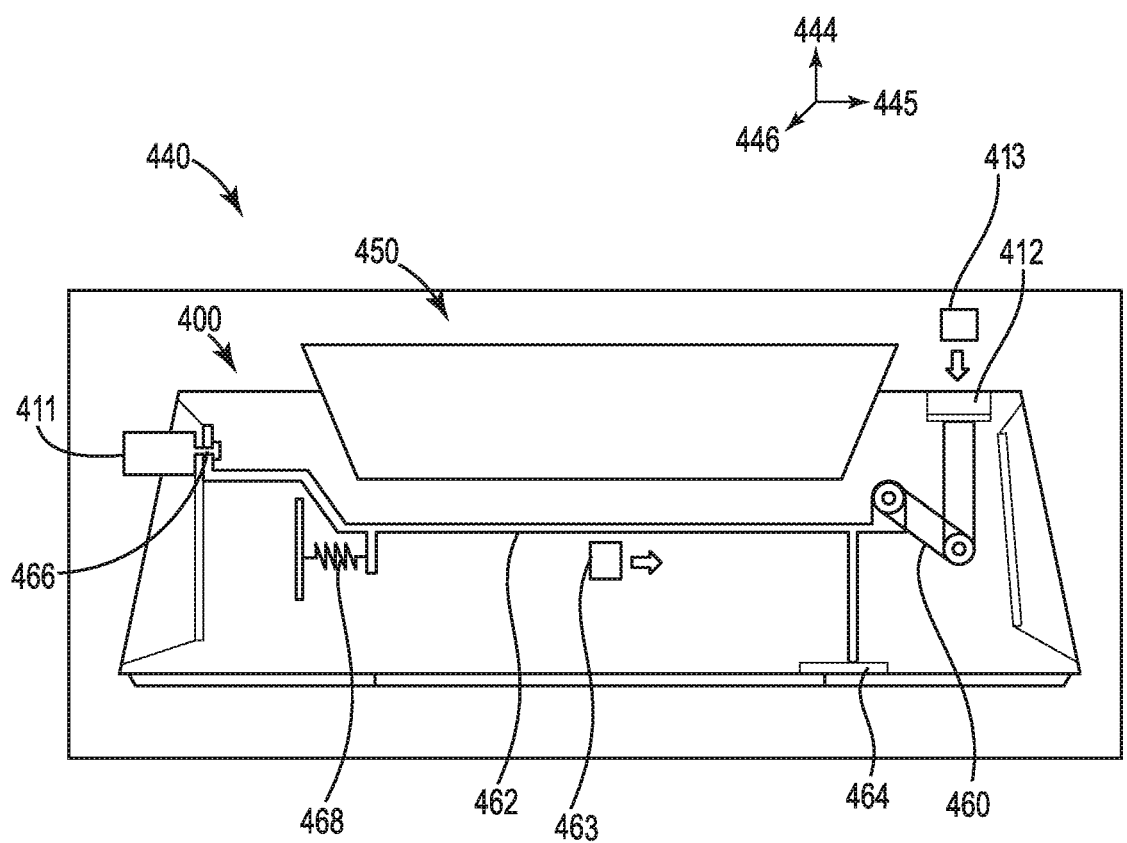
FIG. 4 illustrates a schematic view of a portion of an example of a docking station system consistent with the disclosure.

The locking mechanism 111 refers to a device that can be selectively disposed in the docking station 100 to prevent theft or other unwanted removal of an electronic device received in the cavity 106 of the docking station 100. In some examples, the locking mechanism 111 can be an axial pin tubular lock that can be disposed into an aperture (e.g., aperture 466 as illustrated in FIG. 4) and rotated or otherwise manipulated to prevent removal of the lock and thereby prevent theft or other unwanted removal of an electronic device. That is, in some examples, the locking mechanism can create a physical barrier to the activation of a release.

The release 112 refers to a button or other mechanical device that is actuable to cause an electronic device to decouple from the docking station 100, as described herein. The release can be movable along a path of travel to selectively cause a linking bar via actuation of a trigger 115 or other structure to decouple the electronic device from the docking station 100. For instance, the release can be a mechanical switch including a depressible button, which causes the engagement member (e.g., a hooked engagement member) to release an electronic device coupled to the docking station and thereby allowing a user to remove the electronic device from the docking station 100.

The guide pin 113 refers to a mechanical projection or other structure to guide an electronic device into a desired orientation when coupling and/or decoupling the electronic device from the docking station 100. In some examples, the guide pin 113 can be a projection having a corresponding recess in an electronic device, among other possibilities.

The trigger 115 refers to a mechanical device that can mechanically assist in decoupling the electronic device from the docking station 100. For instance, the trigger 115, as illustrated in FIG. 1, can be disposed around the guide pin 113. Examples of suitable triggers include springs and/or other types of ejection tabs which are actuable (e.g., in response to actuation of the release 112) to exert a force (elastic or static) on an electronic device coupled to the docking station to promote decoupling of the electronic device from the docking station 100. For instance, the trigger 115 can exert a force in a direction substantially orthogonal to the innermost surface 114 of the cradle to promote decoupling of the electronic device from the docking station 100.

Figure 2:
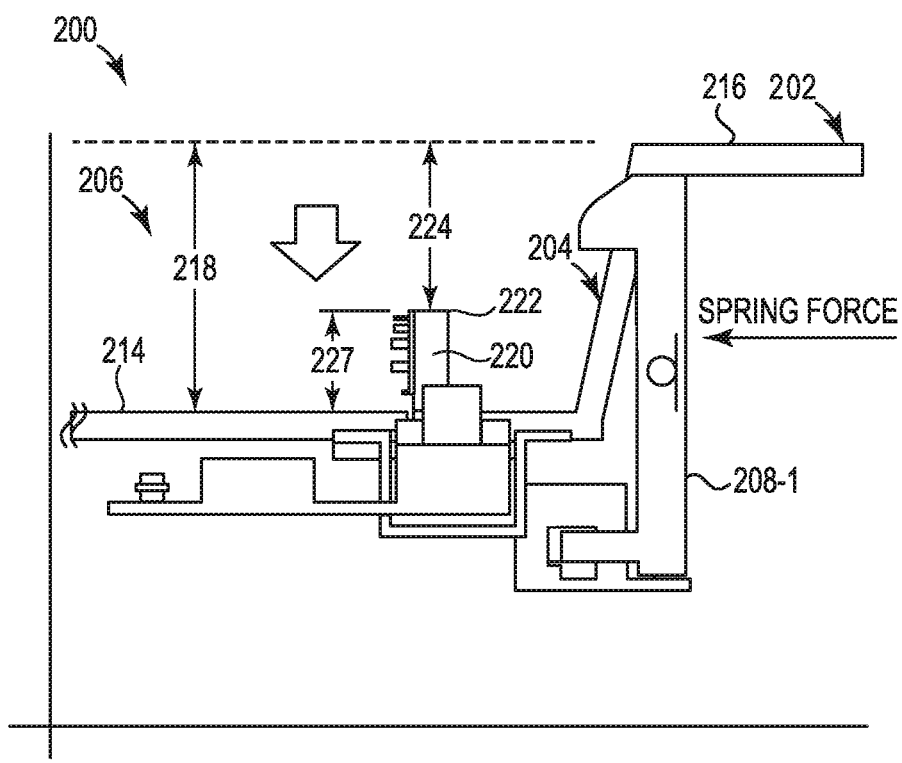
FIG. 2 illustrates a view of a portion of an example of a docking station including a cradle consistent with the disclosure.

FIG. 2 illustrates a view of a portion of an example of a docking station 200 including a cradle 204 consistent with the disclosure. The view of the docking station 200 is taken along axis 101 as illustrated in FIG. 1.

The docking station 200 can include a housing 202 having an exterior surface 216, a cradle 204 including a cavity 206 having an innermost surface 214, an engagement member such as the first engagement member 208-1, a docking connector 220 having an upper surface 222, as illustrated in FIG. 2.

As mentioned, a width (e.g., width 117 as illustrated in FIG. 1) and a depth 218 of the cavity 206 can be sufficient to prevent disengagement of an electronic device coupled to the docking station 200 from decoupling from the docking station responsive to a torque applied on the electronic device. For instance, in some examples, the depth 218 of the cavity 206 can be a depth in a range from 30 millimeters 300 millimeters. All individual values and subranges from 30 millimeters to 300 millimeters are included. As illustrated in FIG. 2, the depth 218 refers to a distance between the innermost surface 214 of the cradle 204 to an exterior surface 216 of the housing 202 that is adjacent to the cradle 204.

As illustrated in FIG. 2, a depth 218 of the cavity 206 can be greater than a height 227 of the docking connector 220 so an upper surface 222 of the docking connector 220 is recessed a distance 224 within the cavity. As mentioned, having the docking connector recessed in the cavity 206 can protect the docking connector from various forces that may directly contact the housing 202 but not directly contact the docking connector 220 recessed in the cavity 206. However, the disclosure is not so limited. Rather, in some examples, the innermost surface 214 can be coplanar with the exterior surface 216 of the housing 202. In such examples, the docking connector can be recessed within the innermost surface, be coplanar with the exterior surface 216, and/or extend above (relative to the innermost surface) above the exterior surface 216.

As illustrated in FIG. 2, the first engagement member 208-1 is in a first position. As described herein, an engagement member can couple an electronic device to the docking station 200 when in the first position and may allow decoupling of the electronic device when in a second position, as described herein in greater detail with respect to FIG. 5 and FIG. 6.

In some examples, the cradle 204 can surround at least 3 percent of an electronic device disposed in the cavity 206 when the electronic device is coupled to the docking station 200. For example, the cradle can be sized and/or shaped to surround from 3 percent to 50 percent of an entire surface area of a housing of an electronic device. All individual values and subranges from 3 to 50 percent are included, such as 3 to 20 percent, 3 to 10 percent, 5 to 10 percent, 15 to 25 percent, 25 to 35 percent, 5 to 45 percent, etc. A housing of an electronic device refers to an exterior surface of an electronic device such as those described herein. The housing of the electronic device can be formed of fabric, metal, and/or plastic, among other suitable materials.

Figure 3:
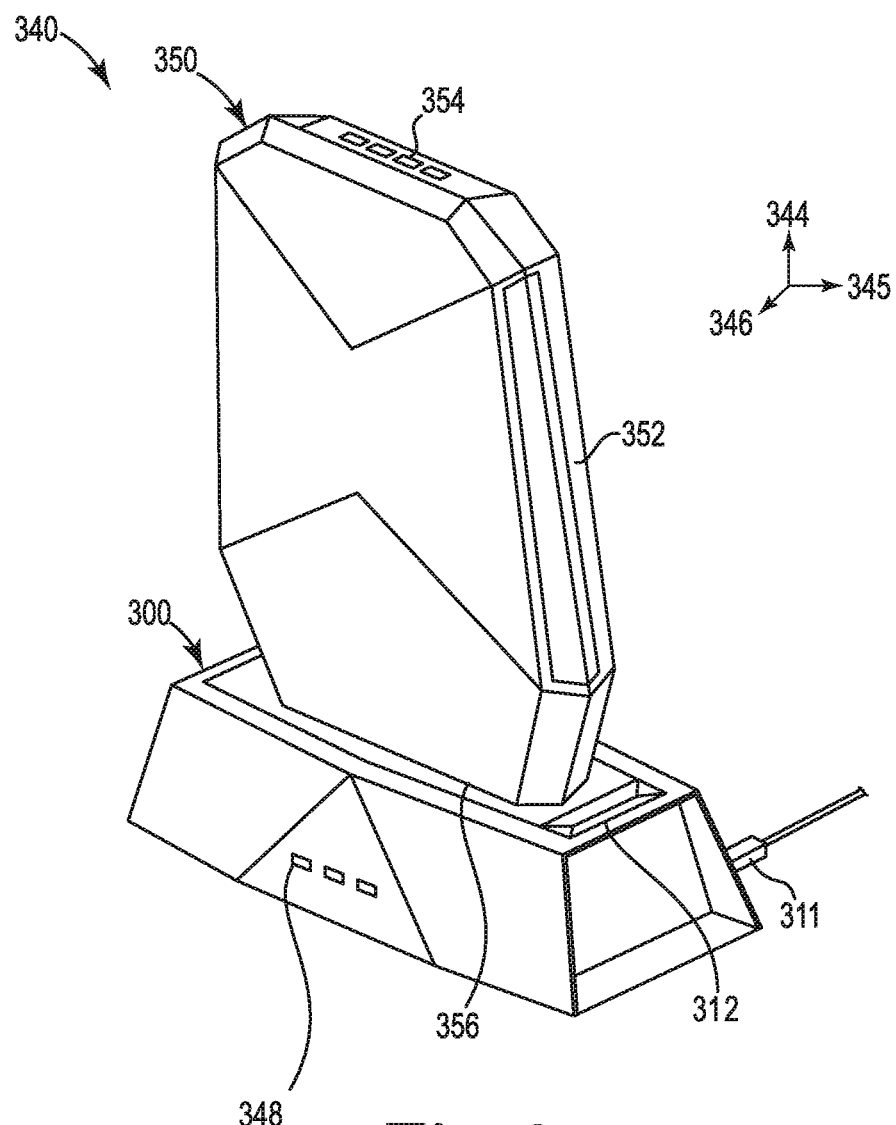
FIG. 3 illustrates an example of a docking station system including an example of an electronic device and an example of a docking station including a cradle consistent with the disclosure.

FIG. 3 illustrates an example of a docking station system 340 including an example of an electronic device 350 and an example of a docking station 300 including a cradle (not shown) consistent with the disclosure. As illustrated in FIG. 3, the cradle can be shaped and/or sized to maintain an electronic device (e.g., a computing device of a VR/AR system) primarily in a vertical orientation along axis 344 relative to axis 345 and/or axis 346, in contrast to other approaches which may lack a cradle and/or maintain an electronic device in a horizontal orientation along axis 345 or other non-vertical position. As illustrated in FIG. 3, a cradle of the docking station 300 can surround at least 3 percent of the electronic device, among other possibilities, when the electronic device 350 is coupled primarily in a vertical orientation (e.g., electronic device is disposed primarily along axis 344). That is, an electronic device can have a length, a width, and depth forming a total volume and respective dimensions of the electronic device. Being coupled primarily in a vertical orientation refers to the device having its longest of the three dimensions extending substantially parallel to axis 344 (e.g., an axis parallel to the direction of gravity). Stated differently, in an example, the electronic device may be in a vertical orientation when a smallest rectangular prism circumscribing the electronic device has a longest dimension of the rectangular prism that is substantially parallel to axis 344 (e.g., an axis parallel to the direction of gravity).

While FIG. 3 illustrates the electronic device 350 as a VR computing device the disclosure is not so limited. Rather, the docking station 300 can be sized and/or shaped to permit coupling to various electronic devices such as laptops, mobile phones, and/or tablets among other types of electronic devices suitable with docking stations including cradles, as described herein.

In some examples, a VR/AR headset (not shown) can be coupled to the electronic device 350 via an interconnect. Data may be transferred to the VR/AR headset from the electronic device in a wired and/or wireless manner. The electronic device can transfer data and/or power from a power source to the VR/AR headset in a wired and/or wireless manner.

Notably, when the electronic device 350 is coupled to the docking station the electronic device can provide various functions consistent with those associated with desktop and/or laptop computing devices. For instance, as mentioned the electronic device can be a VR computing device and can be operable as a desktop computing device when coupled to the docking station. The electronic device 350 can include vents such as vent 352 disposed on the electronic device (located at or otherwise extending above a height of the docking station) to readily permit airflow to the vents when the electronic device is docked in a vertical orientation. Vent 352 illustrated on the side of the electronic device 350 can include a corresponding vent (not illustrated) on the opposite side of the electronic device. In such examples, the system 340 can permit airflow through the electronic device 350 between vent 352 and the corresponding vent such that air can flow between the vent 352 and the corresponding vent, for instance, even when system 340 is placed in a backpack or other container.

The docking station 300 can include various input/output components such as input/output component 348 disposed on a housing of the docking station. Similarly, the electronic device 350 can include input/output components such as input/output component 354 disposed on a housing of the electronic device. Examples of input/output devices include universal serial buses, among other types of input/output components.

In various examples, a cradle of the electronic device is shaped to substantially mirror contours of the electronic device. As used herein, substantially mirror refers to having a distance along interface 356 (which extends 360 degrees around the electronic device) between the electronic device 350 and the docking station 300 of from not more than 0.7 mm at any point along the interface 356. For instance, in some examples a distance between the electronic device 350 and the docking station at the interface 356 can be a distance from 0.1 millimeters to 0.7 millimeters. All individual values and subranges are included. Such distances (0.1 millimeters to 0.7) can desirably reduce an amount of 'wobble' experienced by an electronic device when coupled (in a vertical orientation) to the docking station. For instance, geometry of a surface of an electronic device can be a mirror image such as a mirror image that is reversed in direction to geometry of a corresponding surface of the docking station. Thus, by substantially mirroring the contours of a cradle of the docking station with the contours an electronic device intended to couple to the docking station a secure interference fit can be obtained, as is illustrated in FIG. 3.

FIG. 4 illustrates a schematic view of a portion of an example of a docking station system 440 consistent with the disclosure. As illustrated in FIG. 4, the docking station system 440 can include an electronic device 450 (a portion of the electronic device is illustrated in FIG. 4 for ease of illustration) and a docking station 400. As mentioned, the electronic device 450 can be oriented primarily in a vertical orientation along axis 444 relative to axis 445 and/or axis 446.

The docking station 400 can include a release 412, a linking member 460, a link bar 462 including an aperture 466. The aperture 466 refers to an opening or other object to permit a locking mechanism, such as those described herein, to couple to the link bar 462. For instance, the aperture 466 of the link bar 462 can receive a locking mechanism 411, as illustrated in FIG. 4. When the locking mechanism 411 is received in the aperture 466 the link bar 462 can prohibit movement that permits decoupling of the electronic device 450 from the docking station 400. However, the disclosure is not so limited. Rather a location of the locking mechanism 411 can be varied to a different location on the link bar 462 and/or to be disposed along a path of travel of the releases 412. By prohibiting movement of the link bar 462, linking member 460, and/or the release 412 the locking mechanism 411 can prohibit an engagement member from moving to a second position and/or prohibit a trigger from moving to a second position (as illustrated in FIGS. 1 and 3) thereby prohibiting decoupling of the electronic device 450 from the docking station 400.

In some examples, a spring 468 can disposition the link bar 462 into a first position (corresponding to a first position of the release 412) by exerting a spring force, as illustrated in FIG. 4. In the absence of locking mechanism 411, actuation (represented by 413) of the release 412 can cause the link bar 462 to move to a second position (represented by 463). As the link bar 462 moves to the second position or when the link bar 462 is at the second position the link bar 462 can cause an engagement member to move to a second position and/or cause a trigger to move to a second position and thereby decouple the electronic device 450 from the docking station 400. For instance, in some examples, both an engagement member (not illustrated in FIG. 4) can be moved to a second position (e.g., at which the engagement member is not in contact with the electronic device) and a trigger (not illustrated in FIG. 4) can move to a second position (e.g., at which the trigger is to exert a force on the electronic device at the same time as the engagement member is in the second position) to permit readily decoupling the electronic device 450 from the docking station 400.

As illustrated in FIG. 4, in some examples the link bar 462 can be coupled to a lock 464. In such examples, moving the link bar 462 to the second position can permit actuation of the lock 464, while having the link bar 462 at the first position can physically block a path of and thereby prohibit actuation of the lock 464. Lock 464 can secure an opening and/or an attachment point in the housing, among other possibilities. For instance, lock 464 be adjacent to an opening in a housing that can selectively open and blocking the path of the lock can prohibit the opening from moving to an open position and instead maintain the opening in a closed position.

Figure 5:
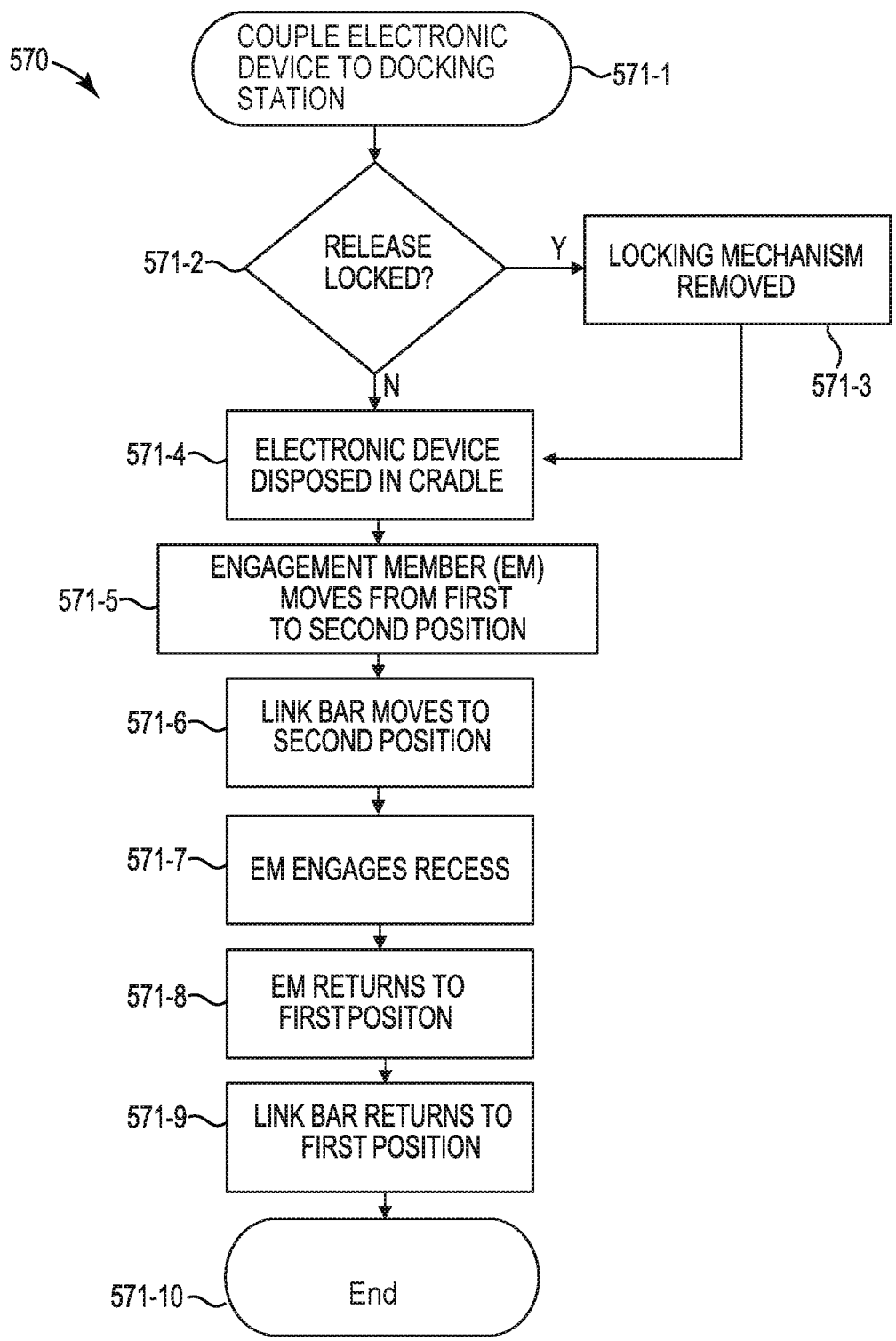
FIG. 5 illustrates a flow diagram of an example of a method of coupling an electronic device to a docking station including a cradle consistent with the disclosure.

FIG. 5 illustrates a flow diagram of an example of a method 570 of coupling an electronic device to a docking station including a cradle consistent with the disclosure, as illustrated at 571-1. At 571-2, the method 570 can include detecting engagement of a locking mechanism prohibiting movement of a release directly or indirectly (when the locking mechanism is disposed in an aperture of a link bar coupled to the release). Detecting can include visual observation and/or attempting to dispose an electronic device into the cradle of the docking station, among other possibilities.

If movement of the release is prohibited the method proceeds to 571-3. At 571-3 the method 570 can include removing the locking mechanism. For instance, the locking mechanism can be removed from a path of travel of the release and/or can be removed from an aperture of a link bar, as described herein.

If movement of the release is allowed the method can proceed to 571-4. At 571-4, the method 570 can include disposing the electronic device in the cradle.

At 571-5 the method 570 can include causing an engagement member to rotate or otherwise move from a first position to a second position. In some examples, the engagement member can move from a first position to a second position responsive to disposing the electronic device in the cradle. For instance, the engagement member can be a hooked engagement member with a tapered hooked portion that is to contact a surface of the electronic device and thereby cause the engagement member to move from a first position (in a position to contact a corresponding recess in an electronic device when the electronic device is disposed in the cradle and contacting an innermost surface of the cradle) to a second position (not in a position to contact the corresponding recess in an electronic device).

Similarly, at 571-6, the method 570 can include causing the link bar to move from a first position to second position. As mentioned, a link bar can be dispositioned by a spring to a first position. As such, actuation of the release can cause the link bar to move from a first position to a second position by providing a force greater than a spring force dispositioning the link bar to the first position, among other possibilities, such as the link bar moving from the first position to the second position responsive to disposing the electronic device in the cradle (e.g., as the engagement members are contacted during disposal of the electronic device in the cradle).

Ceasing actuation of the release and/or disposing the electronic device in the cradle and in contact with an innermost surface of the cradle can cause the engagement member to move from the second position to a first position and engage a corresponding recess in an electronic device, as illustrated at 571-7 and 571-8. Similarly, as illustrated at 571-9 the link bar can return to a first position responsive to ceasing actuation of the release and/or responsive to disposing the electronic device in the cradle and in contact with an innermost surface of the cradle. The method can proceed to end at 571-10 and the electronic device is understood to be coupled to the docking station.

Figure 6:
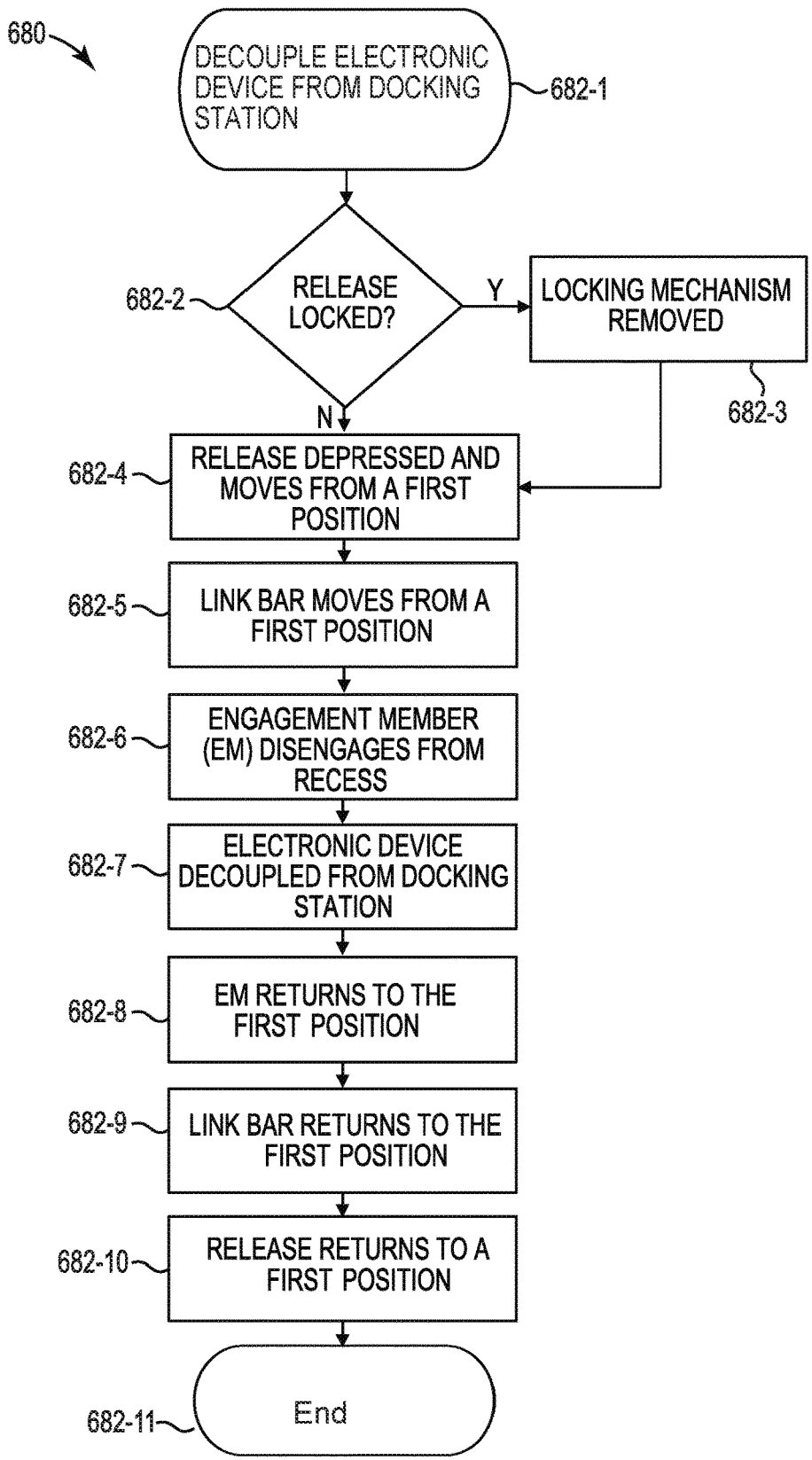
FIG. 6 illustrates a flow diagram of an example of a method of decoupling an electronic device from a docking station including a cradle consistent with the disclosure.

FIG. 6 illustrates a flow diagram of an example of a method 680 of decoupling an electronic device from a docking station including a cradle consistent with the disclosure, as illustrated at 682-1. As illustrated at 682-2 the method 680 can include detecting engagement of a locking mechanism prohibiting the movement of a release directly or inhibiting movement of the release indirectly (when the locking mechanism is disposed in an aperture of a link bar coupled to the release). Detecting can include visual observation and/or attempting to decouple an electronic device from the cradle of the docking station, among other possibilities.

If movement of the release is prohibited the method 680 proceeds to 682-3. At 682-3 the method 680 can included removing the locking mechanism. For instance, the locking mechanism can be removed from a path of travel of the release and/or can be removed from an aperture of a link bar, as described herein.

If movement of the release is permitted the method can proceed to 682-4. At 682-4, the method 680 can include depressing or otherwise actuating a release to move the release from a first position (at a distal end of a path of travel of the release) to a second position (at an opposite end of the path of travel of the release). Responsive to the actuation of the release to the second position a link bar (coupled to the release) can move from a first position to a second position, as illustrated at 682-5.

Responsive to the link bar moving to the second position an engagement member can disengage from a recess, as illustrated at 682-6. Disengaging refers to not contacting the electronic device and/or otherwise not prohibiting decoupling of the electronic device from the cradle of the docking station. That is, responsive to the engagement member disengaging the electronic device can be decoupled from the docking station, as illustrated at 682-7. As mentioned, a trigger can promote decoupling of the electronic device from the docking station, in some examples.

As illustrated at 682-8 and 682-9, the engagement member can return to the first position and the link bar can return to the first position, respectively. For instance, the engagement member can return to the first position and the link bar can return to a first position responsive to actuation of the release ceasing. That is, as illustrated at 682-10 the release can return to a first position from the second position responsive to actuation of the release ceasing. As mentioned, the link bar, engagement member, and the release can be dispositioned by a spring to respective first positions. The method can proceed to end at 682-11 and the electronic device is understood to be decoupled from the docking station.

Figure 7:
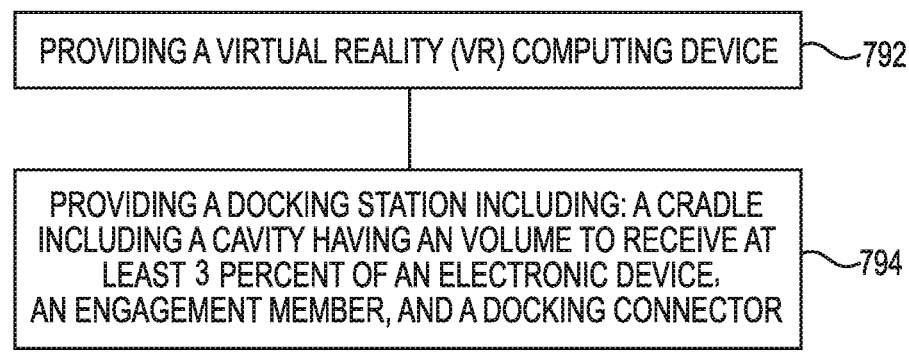
FIG. 7 illustrates a flow diagram of an example of a method suitable with docking stations including cradles consistent with the disclosure.

FIG. 7 illustrates a flow diagram of an example of a method suitable with docking stations including cradles consistent with the disclosure. As illustrated at 792, the method can include providing an electronic device such as a VR computing device. Similarly, as illustrated at 794, the method can including providing a docking station including a cradle including a cavity having a volume to receive at least 3 percent of a total surface area of the VR computing device, an engagement member, and a docking connector. As used herein, "providing" refers to manufacture or procurement of an unassembled component intended for assembly into a larger system including a plurality of components such as an electronic device or a docking station including those electronic devices and docking stations described herein. In some examples, the method can include positioning at least 3 percent of the VR computing device in the cavity of the cradle and causing data and/or power transfer between the electronic device and the docking station when the electronic device is positioned in the cavity of the cradle and coupled to the docking station, as described herein.

In the foregoing detailed description of the disclosure, reference is made to the accompanying drawings that form a part hereof, and in which is shown by way of illustration how examples of the disclosure may be practiced. The examples herein are described in sufficient detail to enable those of ordinary skill in the art to practice the examples of this disclosure, and it is to be understood that other examples may be utilized and that process, electrical, and/or structural changes may be made without departing from the scope of the disclosure.

It will be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that there are no intervening elements (adhesives, screws, other elements), etc.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 202 in FIG. 2. Multiple analogous elements within one figure may be referenced with a reference numeral followed by a hyphen and another numeral or a letter. For example, 108-1 may reference element 08-1 in FIGS. 2 and 108-2 may reference element 08-2, which can be analogous to element 08-1. Such analogous elements may be generally referenced without the hyphen and extra numeral or letter. For example, elements 108-1 and 108-2 may be generally referenced as 108. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:

1. A docking station comprising:
   a housing including a first aperture and a cradle to receive an electronic device;
   an opening in the housing utilized to access an attachment point of the docking station;
   an elastomeric component coupled to an inner surface of the cradle to provide a friction fit between the inner surface of the cradle and the electronic device, wherein in response to a torque received by the electronic device, the elastomeric component is to cushion the electronic device and prevent the electronic device from decoupling from the docking station;
   a release movable between a first and a second release position;
   a link bar coupled to the release, wherein the link bar is movable between a first and second bar position, and wherein the link bar includes a second aperture to receive, via the first aperture, a locking mechanism while the link bar is in the first bar position;

a lock adjacent to the opening in the housing and coupled to the link bar, wherein while the link bar is in the first bar position the lock physically blocks the opening of the housing to prevent access to the attachment point;

an engagement member movable between a first engagement position wherein the engagement member couples to the electronic device and a second engagement position wherein the engagement member does not contact the electronic device;

a guide pin to guide the electronic device while coupling the electronic device to the docking station; and a trigger disposed around the guide pin and movable between a first and a second trigger position where the trigger exerts a force on the electronic device in a direction orthogonal to an innermost surface of the cradle;

wherein in an absence of the locking mechanism in the second aperture of the link bar, the electronic device can be decoupled from cradle of the docking station by actuation of the release from the first release position to the second release position.

2. The docking station of claim 1, wherein the engagement member is to couple to a recess in a body of the electronic device when in the first engagement position.

3. The docking station of claim 1, wherein the cradle is shaped to substantially mirror contours of the electronic device, and wherein the cradle is formed of a depression in the housing of the docking station.

4. The docking station of claim 3, wherein the cradle surrounds at least 3 percent of an entire surface area of a body of the electronic device.

5. The docking station of claim 1, the cradle including a cavity having depth in a range from 30 mm to 300 mm, wherein the depth refers to a distance between an innermost surface of the cradle to an exterior surface of the housing that is adjacent to the cradle.

6. The docking station of claim 1, wherein the link bar is coupled to the locking mechanism on an exterior surface of the docking station to maintain the locking mechanism in a locked position when the link bar is at the first bar position.

7. The docking station of claim 1, wherein the trigger exerting the force on the electronic device in the direction substantially orthogonal to the innermost surface of the cradle is a spring.

8. The docking station of claim 1, wherein the locking mechanism further comprises a Kensington lock.

9. The docking station of claim 1, wherein the locking mechanism further comprises axial pin tubular lock.

10. The docking station of claim 9, wherein the axial pin tubular lock further comprises a Kensington lock.

11. A docking station system comprising:
an electronic device; and
a docking station including:
a housing including a first aperture and a cradle including a cavity to receive the electronic device, the cradle having a depth of at least 30 millimeters;
a docking connector to permit data transfer between the electronic device and the docking station when the electronic device is received in the cradle;
a guide pin to guide the electronic device while coupling the electronic device to the docking connector;
an elastomeric component coupled to a surface of the cradle to provide a friction fit between the surface of the cradle and the electronic device, wherein in response to a torque received by the electronic device, the elastomeric component is to cushion the electronic device and prevent the electronic device from decoupling from the docking connector;
an engagement member movable between a first engagement position at which the engagement member is to couple to the electronic device when received in the cradle and a second engagement position at which the engagement member is not in contact with the electronic device when received in the cradle;
a release movable from a first release position to a second release position;
a link bar coupled to the release, the link bar including a second aperture to receive, via the first aperture, a locking mechanism while the link bar is in a first bar position to obstruct a path of travel of the release;
an opening in the housing utilized to access an attachment point of the docking station;
a lock adjacent to the opening in the housing and coupled to the link bar, wherein while the link bar is in the first bar position the lock physically blocks the opening of the housing to prevent access to the attachment point; and
a trigger disposed around the guide pin and movable between a first trigger position to a second trigger position at which the trigger is to exert a force on the electronic device in a direction substantially orthogonal to an innermost surface of the cradle;
wherein in an absence of the locking mechanism in the second aperture of the link bar, the electronic device can be decoupled from the cradle of the docking station by actuation of the release from the first release position to the second release position.

12. The docking station system of claim 11, wherein the electronic device further comprises a virtual reality (VR) computing device, and wherein the VR computing device is operable as a desktop computing device when received in the cradle.

13. The docking station system of claim 11, wherein the docking connector is disposed on an innermost surface of the cavity to permit coupling the electronic device in a primarily vertically orientation relative to the docking connector.

14. The docking station system of claim 13, wherein the depth of the cavity is greater than a height of the docking connector so an upper surface of the docking connector is recessed a distance within the cavity.

15. The docking station system of claim 11, wherein the cradle is a formed of a continuous material that surrounds a circumference of a body of the electronic device.

16. The docking station system of claim 15, wherein the cradle is a formed of a fabric material.

17. A method comprising:
providing a virtual reality (VR) computing device; and
providing a docking station including:
a housing including a first aperture and a cradle to receive the VR computing device;
an opening in the housing utilized to access an attachment point of the docking station;
an elastomeric component coupled to an inner surface of the cradle to provide a friction fit between the inner surface of the cradle and the VR computing device, wherein in response to a torque received by the VR computing device, the elastomeric component is to cushion the VR computing device and prevent the VR computing device from decoupling from the docking station;

a release movable between a first and a second release position;

a link bar coupled to the release and movable between a first and a second bar position at which the link bar is spaced a distance away from the first aperture of the housing, the link bar including a second aperture to receive, via the first aperture, a locking mechanism while the link bar is in the first bar position;

a lock adjacent to the opening in the housing and coupled to the link bar, wherein while the link bar is in the first bar position the lock physically blocks the opening of the housing to prevent access to the attachment point;

an engagement member movable between a first engagement position where the engagement member couples to an electronic device and a second engagement position where the engagement member does not contact the electronic device;

a guide pin to guide the VR computing device while coupling the VR computing device to the docking station; and a trigger disposed around the guide pin and movable between a first and a second trigger position where the trigger exerts a force on the electronic device in a direction orthogonal to an innermost surface of the cradle;

wherein in an absence of the locking mechanism in the second aperture of the link bar, the VR computing device can be decoupled from the cradle of the docking station by actuation of the release from the first release position to the second release position.

18. The method of claim 17, including:

positioning at least 3 percent of the VR computing device in a cavity of the cradle; and causing data transfer between the VR computing device and the docking station while the VR computing device is positioned in the cavity of the cradle.

* * * * *